United States Patent [19]

Dreyer et al.

[11] Patent Number: 5,330,609
[45] Date of Patent: Jul. 19, 1994

[54] PRESSING ROLL FOR A TIRE BUILDING MACHINE

[75] Inventors: Hans Dreyer, Hamburg; Werner Wedekind, Salzhausen, both of Fed. Rep. of Germany

[73] Assignee: Krupp Maschinentechnik Gesellschaft mit beschränkter Haftung, Essen, Fed. Rep. of Germany

[21] Appl. No.: 79,779

[22] Filed: Jun. 22, 1993

[30] Foreign Application Priority Data

Jun. 23, 1992 [DE] Fed. Rep. of Germany ....... 4220490

[51] Int. Cl.⁵ ............................................. B29D 30/28
[52] U.S. Cl. ..................................... 156/421; 156/412
[58] Field of Search ............... 156/407, 408, 412, 421, 156/457; 492/4, 5, 7, 16, 37, 39, 40, 41

[56] References Cited

U.S. PATENT DOCUMENTS

| 492,072 | 2/1893 | Vaught ................................ 492/40 |
| 1,869,317 | 7/1932 | Stevens ............................ 156/412 |
| 2,600,291 | 6/1952 | Engler . |
| 3,117,047 | 1/1964 | Capistrant et al. ............. 156/421 X |
| 3,747,181 | 7/1973 | Nykopp et al. ......................... 492/5 |
| 4,052,246 | 10/1977 | Albareda et al. .................... 156/412 |
| 4,163,685 | 8/1979 | Kubinski . |
| 4,341,584 | 7/1982 | Czernighowsky .................. 156/412 |
| 4,712,472 | 12/1987 | Meisen et al. ........................... 492/4 |

FOREIGN PATENT DOCUMENTS

| 2806973 | 8/1979 | Fed. Rep. of Germany . |
| 2753272 | 8/1985 | Fed. Rep. of Germany . |
| 2943829 | 3/1991 | Fed. Rep. of Germany . |
| 4021671 | 1/1992 | Fed. Rep. of Germany . |
| 1305056 | 4/1987 | U.S.S.R. . |

*Primary Examiner*—Geoffrey L. Knable
*Attorney, Agent, or Firm*—Spencer, Frank & Schneider

[57] ABSTRACT

A pressing roll for a tire building machine includes a shaft having a longitudinal axis; a plurality of discs inserted on the shaft in an axial series; a mounting arrangement for providing for an individual, radial displaceability of each disc relative to the longitudinal axis; and a force-exerting power arrangement for displacing the discs relative to the shaft.

6 Claims, 3 Drawing Sheets

PRESSING ROLL FOR A TIRE BUILDING MACHINE

CROSS REFERENCE TO RELATED APPLICATION

This application claims the priority of German Application No. P 42 20 490.9 filed Jun. 23, 1992, which is incorporated herein by reference.

BACKGROUND OF THE INVENTION

The present invention relates to a tire building machine for the preparation of pneumatic tire blanks. The machine includes a building drum to accommodate tire plies and a pressing roll cooperating therewith. Tire building machines for bias ply as well as belted tires and for dual or single stage tire building are conventionally provided with various ply suppliers and other devices for introducing and treating the individual components of the blank. Usually, each tire component is associated with specially structured treatment devices, for example, several ply applying rolls, stitching rolls, pressing rolls, splicing rolls and the like. Yielding pressing rolls are made of a foamed material and do not permit an adjustment or control of the pressure along the width and circumference of the blank.

SUMMARY OF THE INVENTION

It is an object of the invention to provide an improved tire-building machine with which the discussed disadvantages are eliminated and which, preferably for several treatment steps for different tire blank components permits the use of a single or several, identical pressing rolls, and additionally permits the setting of different pressures along the width of the blank and during the treatment period.

This object and others to become apparent as the specification progresses, are accomplished by the invention, according to which, briefly stated, the pressing roll for a tire building machine includes a shaft having a longitudinal axis; a plurality of discs inserted on the shaft in an axial series; a mounting arrangement for providing for an individual, radial displaceability of each disc relative to the longitudinal axis; and a force-exerting power arrangement for displacing the discs relative to the shaft.

In equipment provided with suitable pressure generating means, the displaceability of the individual discs permits, for example, the setting of higher application pressure forces in the center region of the tire blank than in the wall regions and/or greater pressures in the splice region than in the remainder of the circumference of the blank. Expediently, the shaft of the pressing roll is supported by a holder by means of which the pressing roll can be adjusted radially to the building drum. Thus the basic pressure force of the pressing roll is applied by the holder and the adjustability of the disks relative to one another is utilized merely for a fine setting along the width or the circumference of the tire blank.

According to a further feature of the invention, the individual discs are of identical structure and each disc includes an inner portion and an outer ring which rotatably surrounds the inner portion by way of a ball bearing. The inner portion is provided with an essentially rectangular recess, the side faces of which slide radially to the building drum (and radially to the pressing roll shaft) on the side faces of the shaft, which has a rectangular cross section. The length of the recess is, by the length of one stroke, greater than the corresponding length of the cross section of the shaft. This configuration is very simple and cost-effective, it requires little maintenance and is wear-resistant. Separate or suitably interconnected pressure generating devices for each disc are accommodated in the space between the shaft and the recess in order to control the pressure for the discs in the direction of the building drum. This is effected in a particularly advantageous manner by disposing a separate displacement hose in the top and bottom displacement chambers formed between the top and bottom faces of the recess, on the one hand, and the corresponding faces of the shaft, on the other hand. The displacement hoses extend over the length of the pressing roll and can be charged with a pressure medium. The hoses may be made of an elastic or a non-elastic but foldable inner wall that seals against the pressure medium and a fabric sleeve surrounding the inner wall in order to reduce wear. Different regions of each of the top and bottom displacement chambers may be charged to a different degree and thus different pressure forces can be generated over time or along the length of the pressure roll for individual discs and selected disc groups. A simple and effective application of this possibility results by charging the displacement hose with pressure in the top displacement chamber from both ends of the pressure roll and by compressing the hose in its center portion by means of an exchangeable clamping member of selectable length. In this manner it is feasible to quickly and reliably adapt the pressing roll to different blank sizes and shapes that are to be assembled on the building drum.

The charging pressure of the pressure medium in the displacement hoses can be regulated. A differentiation in the stroke can also be effected by controllable throttles inserted into the displacement hose. To ensure a ready mobility of the discs relative to one another, the discs are expediently made of a material that has good sliding characteristics and anti-friction properties with respect to the tire components, for example a suitable plastic, and are additionally selectively subjected to a sand-blasting treatment on the faces oriented towards the rubber material.

DESCRIPTION OF THE PREFERRED EMBODIMENT

Figure 1:
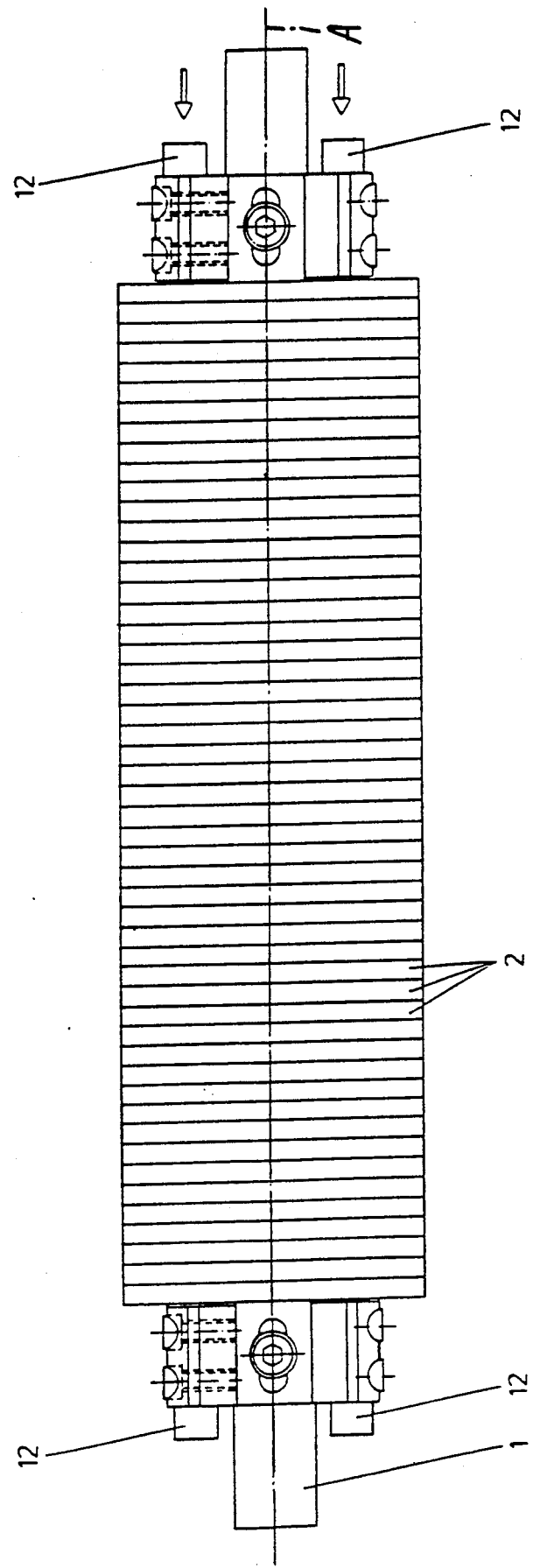
FIG. 1 is a side elevational view of a pressing roll for a tire building machine according to a preferred embodiment of the invention.
Figure 2:
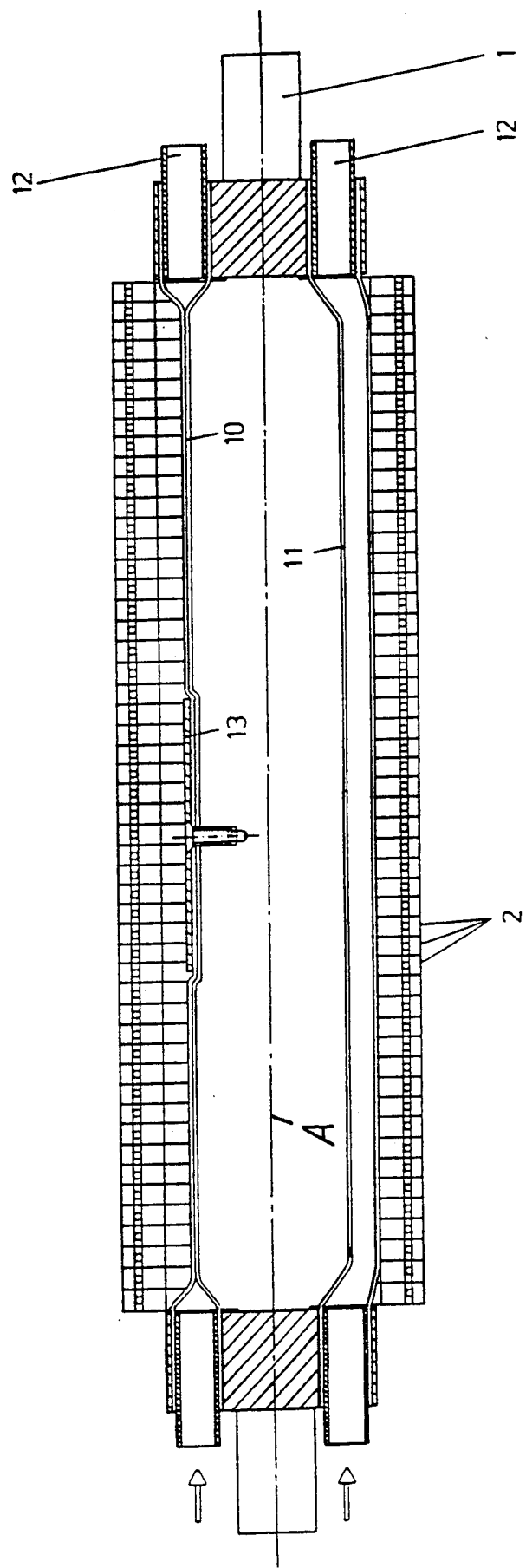
FIG. 2 is a sectional side elevational view of the preferred embodiment.

Turning to FIGS. 1 and 2, there is illustrated therein a pressing roll assembly of a non-illustrated tire building machine. The pressing roll assembly includes a shaft 1 having a longitudinal axis A. The shaft 1, which has an approximately square cross section, is non-rotatably supported in a non-illustrated holder of the tire building machine. By means of the movable holder, the pressing roll can be brought radially against the building drum (also not shown) of the tire building machine. A plurality of identical discs 2 are mounted on the shaft 1 along its working length. The discs cannot rotate, but they are radially (perpendicularly) displaceable relative to the shaft axis A.

Figure 3:
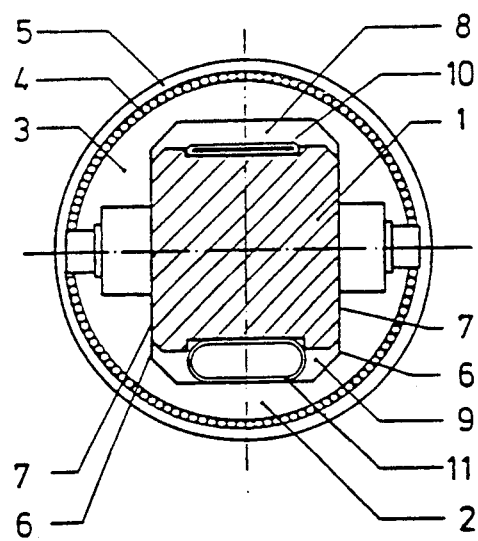
FIG. 3 is a sectional end elevational view of the preferred embodiment.

As shown in FIG. 3, each disc has an inner portion 3 and an outer portion (ring) 5 that surrounds the inner portion 3. Rotation of the outer portion 5 relative to the inner portion 3 is facilitated by a ball bearing 4 circumferentially surrounding the inner portion 3. The inner portion 3 is provided with an essentially rectangular central recess whose side faces 6 slide on the side faces 7 of shaft 1. The recesses of the discs 2 are in alignment and together define an elongated axial cavity accommodating the shaft 1. An upper portion of the cavity not occupied by the shaft 1 forms a top displacement chamber 8, whereas a bottom portion of the cavity not occupied by the shaft 1 forms a bottom displacement chamber 9. The top displacement chamber 8 is oriented away from, while the bottom displacement chamber 9 is oriented towards the building drum.

Displacement hoses 10 and 11, chargeable with compressed air extend over the length of the pressing roll and are situated in the top and bottom displacement chambers 8 and 9, respectively. Air coupling nipples 12 are provided at the ends of displacement hoses 10 and 11. By means of the pressure difference between the two displacement hoses, the displacement of discs 2 relative to shaft 1 can be adjusted and controlled as a whole, in sections or individually relative to one another. An exchangeable clamping member 13 is inserted in the central portion of the pressing roll so as to extend, for example, over a length that corresponds to the width of one ply of the tread of the tire blank to be built up. By means of the clamping member 13 the top displacement hose 10 is compressed in the top displacement chamber 8 so that, if the pressure is otherwise unchanged, the pressure exerted on the building drum by the discs 2 associated with the central portion is increased. For easy displaceability of discs 2 relative to one another, they are made of a material which has low-friction sliding surfaces and that also rolls easily in ball bearing 4.

It will be understood that the above description of the present invention is susceptible to various modifications, changes and adaptations, and the same are intended to be comprehended within the meaning and range of equivalents of the appended claims.

What is claimed is:

1. A pressing roll for a tire building machine, comprising
   (a) a shaft having a longitudinal axis, a substantially rectangular cross-sectional outline, opposite top and bottom sides and opposite lateral sides; said lateral sides having a length extending perpendicularly to said longitudinal axis;
   (b) a plurality of discs inserted on said shaft in an axial series; each said disc having an inner part, an annular outer part circumferentially surrounding said inner part and a ball bearing positioned between said inner and outer parts; said outer part being rotatable relative to said inner part; said inner part of each said disc including a substantially rectangular aperture having opposite top and bottom sides and two opposite lateral sides; said lateral sides having a length extending perpendicularly to said longitudinal axis; said shaft passing through said aperture; said length of said opposite lateral sides of said aperture being greater than said length of said opposite sides of said shaft; said opposite lateral sides of said aperture being slidable on said opposite sides of said shaft; said apertures forming part of said mounting means;
   (c) mounting means for providing for an individual displaceability of each said disc perpendicularly to said longitudinal axis;
   (d) force-exerting power means for displacing said discs relative to said shaft;
   (e) a cavity extending along said longitudinal axis and being defined by the apertures of the serially-arranged discs;
   (f) a top displacement chamber forming a part of said cavity and bounded by said top side of said shaft and said top side of the aperture of each said disc;
   (g) a bottom displacement chamber forming part of said cavity and bounded by said bottom side of said shaft and said bottom side of the aperture of each said disc;
   (h) top and bottom displacement hoses disposed in said top and bottom displacement chambers, respectively; and
   (i) pressurizing means for inflating said top and bottom displacement hoses by a pressurized fluid for displacing said discs relative to said shaft; said top and bottom displacement hoses and said pressurizing means forming said force-exerting power means.

2. The pressing roll as defined in claim 1, wherein said pressurizing means includes means for introducing pressurized fluid into said top and bottom displacement hoses at opposite axial ends thereof.

3. The pressing roll as defined in claim 1, wherein said pressurizing means includes means for introducing pressurized fluid into said top displacement hose at opposite axial ends thereof; further comprising a replaceable clamping member of selected length disposed in said top displacement chamber and compressing said top displacement hose along a selected length thereof.

4. The pressing roll as defined in claim 1, further comprising means for regulating the pressure of said pressurized fluid.

5. The pressing roll as defined in claim 1, wherein said discs are of a material having good gliding properties for easy displaceability of said discs relative to one another; said discs being non-adhesive to tire component and further having sand-blasted surfaces; the sand-blasted surfaces being oriented towards tire material during operation.

6. The pressing roll as defined in claim 5, wherein said material is a plastic.

* * * * *